Patented Aug. 25, 1931

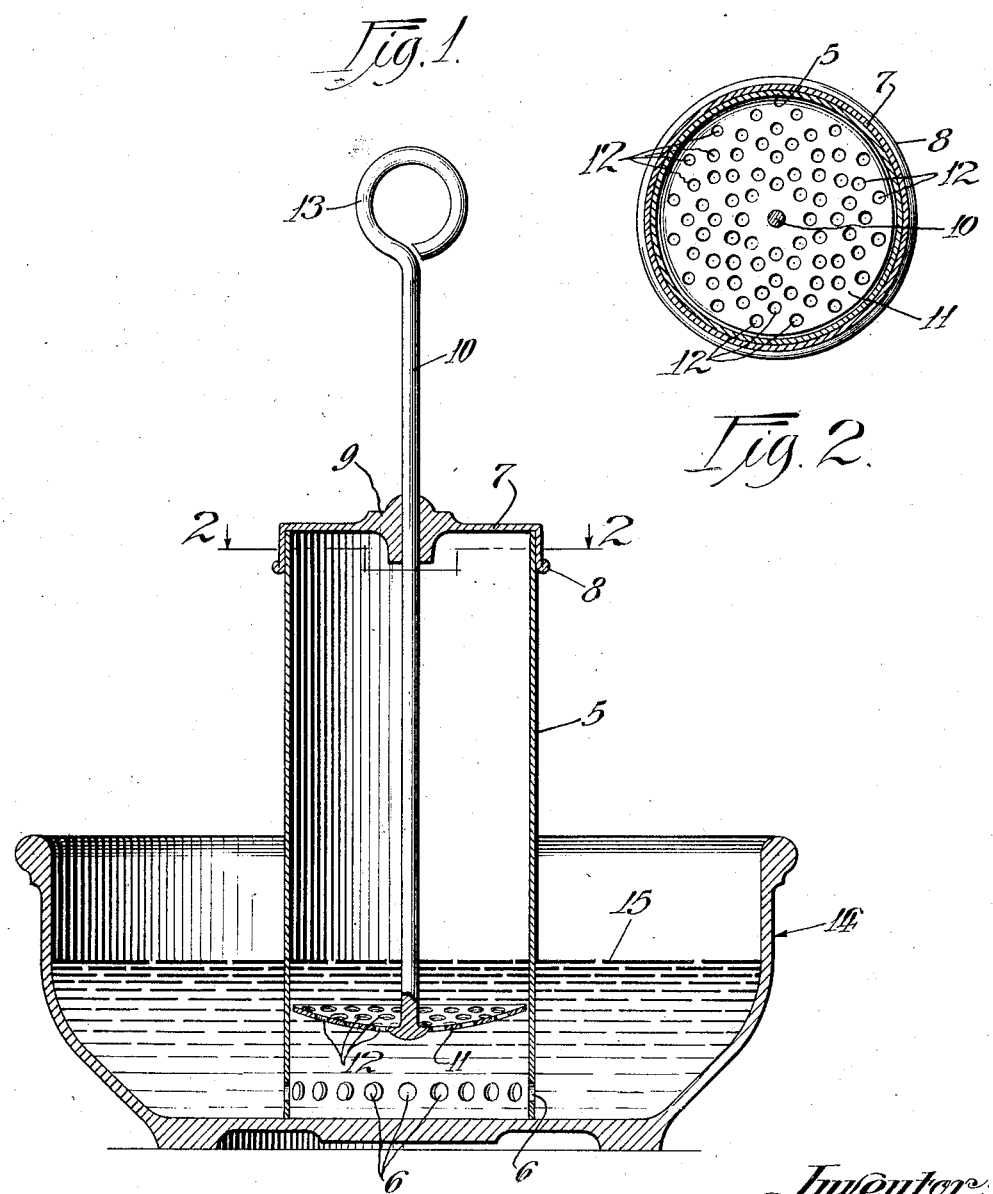

1,820,718

UNITED STATES PATENT OFFICE

AUGUST J. WILLEMS, OF CHICAGO, ILLINOIS

DEVICE FOR WHIPPING CREAM AND SIMILAR USES

Application filed August 1, 1930. Serial No. 472,215.

This invention relates to devices for whipping cream, beating eggs, and similar uses, the principal object being to produce a simple and inexpensive, yet practical and efficient structure, which is sanitary and easily cleaned. Other objects and advantages to be obtained will hereinafter more fully appear.

A practical adaptation of the invention is illustrated in the accompanying drawings, in which:

Fig. 1 is a vertical sectional view; and

Fig. 2 is a transverse section on the line 2—2 of Fig. 1.

Referring now to the drawings, the numeral 5 designates the body portion of the device which is in the form of an open-ended tube, preferably cylindrical. Near one end of the tube 5 is provided with an annular series of apertures 6 and the opposite end has a closure member 7 detachably fitted thereon, said closure being preferably provided with a beaded marginal portion 8 to facilitate the placing of the cover on the tube.

Slidable through an opening in a central enlargement or boss 9 on the closure member 7 is a plunger rod 10. at the inner end of which is provided a disk 11 which is slightly dished, as shown. This disk, which constitutes a dasher head, is only slightly less in diameter than the tube 5 so as its marginal portion operates in close proximity to the wall of the tube, and it is provided with a multiplicity of closely positioned perforations 12. At the outer end of the plunger rod 10 is provided a suitable handle, preferably by forming the end of the rod into a ring or loop 13.

In use, the device is placed in a bowl or other receptacle 14 containing the cream, eggs, or other liquid material 15 to be whipped or beaten, the tube 5 resting with its open end on the bottom of the bowl or receptacle 14, in which position the device may be conveniently supported by one hand, while the dasher is being operated by the other hand. By reciprocating the dasher forcibly within the tubular body portion 5 of the device the contents of the tube are churned, and due to the effective agitation of the material, not only by the reciprocation of the disk but by the forcible passage of the material through the apertures 12 alternately from opposite sides of the disk and also by the pumping effect of the dasher in drawing the surrounding material in the bowl into the tube 5 through the apertures 6 and alternately ejecting the material through said apertures, the whipping or beating action is greatly enhanced. In addition to the general effect of reciprocating the dasher within the tubular body of the device there is a further advantage in the dished form of the disk 11 in that on the up stroke of the dasher the material is moved towards the axis of the device and on the down stroke the effect is to move the material towards the wall of the tube 5. So, too, when the plunger has reached the end of its lowermost position the apex of the disk may touch the bottom of the bowl when the marginal portion of the disk is in a plane above the annular series of apertures 6.

Obviously, the device is easily cleaned and kept in a sanitary condition, as the closure member 7 is removable and the dasher may be removed entirely from the tube so that each part can be thoroughly cleaned and sterilized.

While the structure illustrated in the drawings is an ideal and practical embodiment of the invention, it is to be understood that considerable modification may be made within the spirit and scope of the invention as defined by the appended claims. The invention, therefore, is not limited to the specific construction shown in the drawings.

Having thus described my invention, what I claim as new and desire to secure by Letters Patent is:

1. A device of the character described, comprising an open-ended tubular body member, said body member having an annular series of apertures near its open end, and a reciprocatory dasher in said tubular body, said dasher comprising a concavo-convex perforated disk-like head, the convex side of said head being disposed toward the open end of the body member and the marginal portion of said head being in a plane relative to the crown thereof, whereby, when the crown coincides with the plane of the open end of the body member said marginal portion of the head is in a plane inwardly from the end of the body member and beyond the annular series of apertures of said body member.

2. A device of the character described, comprising a tubular body member open at its opposite ends, said body member having a removable cover at one end and the opposite end portion being provided with an annular series of apertures, and a dasher comprising a reciprocatory rod slidable axially through said removable cover and a perforated concavo-convex disk-like head secured on the inner end of said reciprocatory rod with its convex side toward the annularly apertured open end of the body member, said concavo-convex head being of a depth, whereby, when said head is in a position with its central crown portion coinciding with the plane of the open end of said body member its marginal portion is in a plane inward from said open end of the body member beyond the annular series of apertures of said body member.

In testimony whereof I have signed my name to this specification.

AUGUST J. WILLEMS.